US012470870B2

(12) United States Patent
Von Saint-George et al.

(10) Patent No.: US 12,470,870 B2
(45) Date of Patent: Nov. 11, 2025

(54) SPATIAL SOUND IMPROVEMENT FOR SEAT AUDIO USING SPATIAL SOUND ZONES

(71) Applicant: HARMAN BECKER AUTOMOTIVE SYSTEMS GmbH, Karlsbad-Ittersbach (DE)

(72) Inventors: Matthias Von Saint-George, Pfinztal (DE); Martin Olsen, Struer (DK); Daniel Bracht, Karlsruhe (DE)

(73) Assignee: Harman Becker Automotive Systems Gmbh, Karlsbad-Ittersbach (DE)

( * ) Notice: Subject to any disclaimer, the term of this patent is extended or adjusted under 35 U.S.C. 154(b) by 177 days.

(21) Appl. No.: 18/523,644

(22) Filed: Nov. 29, 2023

(65) Prior Publication Data

US 2024/0187790 A1 Jun. 6, 2024

(30) Foreign Application Priority Data

Dec. 1, 2022 (EP) .................................... 22210809

(51) Int. Cl.

| | |
|---|---|
| ***H04R 3/12*** | (2006.01) |
| ***H04R 5/02*** | (2006.01) |
| ***H04R 5/04*** | (2006.01) |
| ***H04S 7/00*** | (2006.01) |

(52) U.S. Cl.

CPC ................. *H04R 3/12* (2013.01); *H04R 5/02* (2013.01); *H04R 5/04* (2013.01); *H04S 7/302* (2013.01); *H04S 2400/11* (2013.01); *H04S 2420/01* (2013.01)

(58) Field of Classification Search

CPC ... H04R 3/00; H04R 3/12; H04R 5/02; H04R 5/023; H04R 5/04; H04R 2420/05; H04R 2499/13; H04S 3/002; H04S 7/30; H04S 7/302; H04S 2400/11; H04S 2420/01

USPC .......................................................... 381/300

See application file for complete search history.

(56) References Cited

U.S. PATENT DOCUMENTS 6,243,476 B1 * 6/2001 Gardner .................. H04S 3/002 381/1
2022/0070587 A1 3/2022 Lopez Zuleta et al.
2022/0174446 A1 6/2022 Watanabe

* cited by examiner

*Primary Examiner* — Paul Kim
(74) *Attorney, Agent, or Firm* — Artegis Law Group, LLP

(57) ABSTRACT

A computer-implemented method performed by an audio system including a processor and a plurality of loudspeakers, comprises receiving an audio signal to be output to a listener, obtaining a first Head Related Transfer Function (HRTF) corresponding to a first predefined listening pose of the listener, obtaining a second HRTF corresponding to a second predefined listening pose of the listener, determining, for each of the plurality of loudspeakers a respective loudspeaker signal using the audio signal, the first HRTF, and the second HRTF, and simultaneously outputting, via the plurality of loudspeakers using the loudspeaker signals, a first sound signal for the first predefined listening pose corresponding to the first HRTF and limited to a first predefined spatial zone, and a second sound signal for the second predefined listening pose corresponding to the second HRTF and limited to a second predefined spatial zone different from the first predefined spatial zone.

20 Claims, 6 Drawing Sheets

SPATIAL SOUND IMPROVEMENT FOR SEAT AUDIO USING SPATIAL SOUND ZONES

CROSS-REFERENCE TO RELATED APPLICATIONS

This application claims the priority benefit of European Patent Application No. EP 22 210 809.4, filed Dec. 1, 2022, entitled "Spatial Sound Improvement for Seat Audio using Spatial Sonds Zones," which is incorporated herein by reference.

TECHNICAL FIELD

Various examples of the disclosure generally relate to audio systems. Various examples of the disclosure specifically relate to audio systems for binaural sound rendering using predefined spatial sound zones arranged around a listener's head.

BACKGROUND

Conventional headrest audio systems suffer from a perceived sound stage behind the listener's head. This is caused by the location of the speakers, as these are placed behind the head. A listener detects the exact location of a loudspeaker by intuitively knowing his own head related transfer function (HRTF). If the location of the loudspeaker or the head rotation relative to the source is changed, the HRTF from the loudspeaker to the left and right ear changes. From this change in the perceived sound the listener knows the position of the source. To create the illusion of a loudspeaker location, one approach is to use head-tracking systems. The sound applied to left and right ear is processed with audio filters to create the same acoustical perception as known from the own HRTF, by modifying the output according to different HRTFs based on continuously acquired head-tracking information. The disadvantage of such techniques is that real-time computational effort in audio processing system and hardware for a head-tracking system are required, in order to create a realistic binaural effect for the listener. Providing and operating such a head-tracking system, as well as providing sufficient processing capability and memory generates additional cost and often is disturbed by latencies in the audio processing.

SUMMARY

Accordingly, there is a need for advanced techniques for audio rendering systems, which alleviate or mitigate at least some of the above-identified restrictions and drawbacks.

This need is met by the features of the independent claims. The features of the dependent claims define further advantageous examples.

In the following, the solution according to the present disclosure is described with regard to the claimed methods as well as with regard to the claimed audio systems, wherein features, advantages, or alternative embodiments can be assigned to the other claimed objects and vice versa. In other words, the claims related to the systems can be improved with features described in the context of the methods, and the methods can be improved with features described in the context of the systems.

A computer-implemented method is provided for generating an audio rendering for a listener. The method can, for example, be carried out by an audio system comprising a processor, memory, and a plurality of loudspeakers.

In a step, an audio signal is received. The audio signal can be an audio input signal into the audio system, for example an analog or digital audio signal which represents a sound signal to be generated by a loudspeaker. The audio signal can be output or broadcasted to a listener by one or more loudspeakers. The audio signal can be received by a processor of the audio system.

The audio signal can comprise positional information. Positional information can define a position, at which a sound event included in a sound signal, and represented by the audio signal, or a physical loudspeaker, is located or perceived by a listener, when the listener hears the sound signal. Accordingly, the sound event can have a position relative to the listener, which can depend on a predefined listening pose, or short listening pose, of a listener. A listening pose can define a position and orientation of the listener, while the listener perceives a sound signal with his ears. A sound signal can be perceived by the listener when adopting a specific pose, which is a position and orientation of the listener's head. Accordingly, a sound event or loudspeaker of the sound signal can be perceived at a specific position and in a specific direction relative to the listener.

By processing the audio signal using a Head Related Transfer Function (HRTF), and playing back the processed audio signal to a listener, the position of a sound event can be conveyed to the listener, relative to the listener. When the listener is in a first predefined listening pose, the positional information can define a first position of a sound event, where the listener perceives the sound event, relative to the first predefined listening pose. When the listener is in a second predefined listening pose, the positional information can define a second position of a sound event, relative to the listener, where the listener perceives the sound event, based on the second predefined listening pose. In general, the positional information associated with a sound event can include a changing position of the sound event relative to the user over time. In various examples, the sound event can be perceived at different positions relative to the listener, as the listener adopts different listening poses.

In a step, a first head related transfer function (HRTF) corresponding to a first predefined listening pose, or in short listening pose, of the listener is obtained.

In a step, a second HRTF corresponding to a second predefined listening pose of the listener different from the first listening pose is obtained.

The first and/or second HRTF can be obtained by a processor, for example from local memory within the audio system or can be transmitted over a communication network from a remote device or system. The HRTFs can be precomputed HRTFs, each generated for the listener based on a respective predefined different listening pose, which correspond to listening poses that the listener may adopt during listening to a sound signal generated based on the input audio signal.

Accordingly, the first listening pose of the listener corresponds to the first HRTF, and/or the first HRTF corresponds to the first listening pose. The second listening pose of the listener corresponds to the second HRTF, and/or the second HRTF corresponds to the second listening pose. The first and second HRTF are different HRTFs, which are each defined by the respective listening pose with respect to the positional information included in the audio signal. In other words, the first HRTF can be based on and/or defined by the first listening pose of the listener. The second HRTF can be based on and/or defined by the second listening pose of the listener.

In a step, for each of the plurality of loudspeakers, a respective different loudspeaker signal is determined using the audio signal, and the first HRTF and the second HRTF. In other words, the respective loudspeaker signals are determined based on each one of the audio signals, the first HRTF and the second HRTF. A respective loudspeaker signal can be determined by the processor, and can correspond to an input signal for a loudspeaker included in the plurality of loudspeakers, based on which the loudspeaker generates a sound signal (i.e. sound or sound waves that can be received or perceived by the listener).

In other words, for each of the spatial zones, in which a sound signal is to be generated, the respective HRTF for the spatial zone, based on the listening pose of the listener, when his car is within the respective spatial zone, is used for determining, i.e. calculating, the loudspeaker signals for the plurality of loudspeakers.

In a step, a first sound signal is output within a first predefined spatial zone, and a second sound signal is output within a second predefined spatial zone, both arranged around the listener's head, both output simultaneously to each other, in other words at the same time, and using the determined loudspeaker signals. The first sound signal and the second sound signal can comprise sound, or sound waves, generated by the plurality of loudspeakers, which can be heard or received selectively by the listener based on his currently adopted listening pose.

In various examples, the listener can adopt each of a plurality of predefined listening poses, which can correspond to various predefined postures the listener can hold or move to while listening to a sound signal. In each of the listening poses, the listener perceives the sound signal differently specific to the listening pose and the HRTF specific to the listening pose.

The first spatial zone can correspond to the first listening pose of the listener, such that the listener's car is within or near the first spatial zone, and receives the sound signal generated within the first spatial zone, when the listener is in the first listening pose. In the same way, the second spatial zone can correspond to the second listening pose of the listener. The first and second spatial zones can be strictly different from each other, wherein they do not overlap. The first and second spatial zones can be separated from each other by 3D space. The first and second spatial zones may not cover completely the same 3D space. The first and second spatial zones can partially overlap, providing a more gentle transition from one spatial zone to the other spatial zone. The first and second spatial zones can be located adjacent to or besides each other. The first or second spatial zone each can include at least a spatial region that is not included in the respective other of the first or second spatial zone.

The first and second spatial zones can refer to predefined spatial regions in 3-dimensional space around a listener's head. The first and second spatial zones can be defined, for example, as finite spatial regions, or as solid angle regions, among other possibilities. The first and second spatial zones can correspond to regions near, adjacent to, or surrounding, an car of the listener. In other words, the 3D space around the listener can be divided into different spatial regions, wherein in each of the spatial zones (at least predominantly) a different sound signal is perceivable, in particular a sound signal based on a different HRTFs.

The first sound signal can be limited to the first spatial zone. Limiting the sound signal to a spatial zone can comprise one or more of the following. The first sound signal can be perceived predominantly or mainly in the first spatial zone, for example the first sound signal can be predominantly perceived compared to perception of the second sound signal in the first spatial zone, and/or the first sound signal can be predominantly perceived in the first spatial zone compared to the second spatial zone. The first sound signal can be perceived only in the first spatial zone. The first spatial zone can have a central region, in which the listener perceives only or predominantly the first sound signal. The first spatial zone can have a peripheral region, for example an overlapping region with the second spatial zone, around the central region, in which the listener perceives predominantly the first sound signal, and to a lesser extent also the second sound signal. In various examples, within the first spatial zone, the second sound cannot be perceived. In other examples, the extent (i.e. volume, sound level or sound intensity) to which a listener can perceive the first sound signal within the first spatial zone louder than the second sound signal within the first spatial zone, can comprise a difference greater than 5 dB, or 10 dB, or 20 dB.

In a similar way as the first sound signal is limited to the first spatial zone, the second sound signal can be limited to the second spatial zone. For example, the second sound signal can be perceived predominantly or mainly in the second spatial zone. The second sound signal can be perceived only in the second spatial zone. The second spatial zone can have a central region, where the listener perceives only or predominantly the second sound signal. The second spatial zone can have a peripheral region, for example an overlapping region with the first spatial zone, around the central region, where the listener perceives predominantly the second sound signal, and to a lesser extent also the first sound signal. In other examples, within the second spatial zone, the first sound cannot be perceived. In various examples, the extent (i.e. volume, sound level or sound intensity) to which a listener can perceive the second sound signal within the second spatial zone louder than the first sound signal within the second spatial zone, can comprise a difference greater than 5 dB, or 10 dB, or 20 dB.

In general, the first sound signal corresponding to the first HRTF is limited to the first predefined spatial zone, such that the listener (predominantly) perceives the audio signal processed using the first HRTF, when the listener is in the first listening pose. And the second sound signal corresponding to the second HRTF is limited to the second predefined spatial zone, such that the listener (predominantly) perceives the audio signal processed using the second HRTF, when the listener is in the second listening pose.

The first and the second sound signals are output to the listener in their respective spatial zones around the listener simultaneously. When the listener changes his posture, i.e. his listening pose, then he moves from the first listening pose to the second listening pose. Accordingly he actively moves from receiving the first sound signal to receiving the second sound signal, by moving physically from the first into the second spatial zone, i.e. into another sound receiving zone, wherein the HRTFs used for played out sound in the respective spatial zones do not change based on the listener's movement. When the listener hears the audio signal in the first listening pose, he perceives (the positional information in) the audio signal based on the first HRTF, and when the listener changes posture, the listener hears the audio signal in the second listening pose, and he perceives (the positional information in) the audio signal based on the second HRTF. In such a way, different sound signals are received by the listener caused by physical movement of the listener.

The first and the second sound signal can be generated and output to the listener by the plurality of loudspeakers, each loudspeaker using a respective loudspeaker signal.

It is to be understood, that the techniques have been described for a single car of the listener, and that the respective techniques can be applied simultaneously to each of the listener's left and right ears, for example for creating binaural sound. In general, a plurality of spatial (sound) zones can be created around the listener's head for each of the left and right cars of the listener, such that when the listener is in the first listening pose, the left and right car of the listener are in corresponding spatial zones for the left respectively right car of the listener, each receiving the audio signal of a respective HRTF, for creating binaural sound.

A corresponding audio system is provided. The audio system comprises at least one processor, memory, and a plurality of loudspeakers. The plurality of loudspeakers can be arranged at predefined positions around a listener's head.

The processor is configured for receiving an audio signal to be output to a listener, obtaining a first Head Related Transfer Function (HRTF) corresponding to a first predefined listening pose of the listener, obtaining a second HRTF corresponding to a second predefined listening pose of the listener different from the first pose, and determining, for each of the plurality of loudspeakers a respective loudspeaker signal using the audio signal, the first HRTF and the second HRTF.

The loudspeakers are configured for outputting, using the loudspeaker signals, a first sound signal for the first listening pose corresponding to the first HRTF and limited to a first predefined spatial zone, and a second sound signal for the second listening pose corresponding to the second HRTF and limited to a second predefined spatial zone different from the first predefined spatial zone, simultaneously.

The audio system can further be configured to perform any method or any combination of methods as described in the present disclosure.

By the disclosed techniques, a latency caused by conventional head-tracking systems for providing an updated sound signal based on an updated HRTF can be completely avoided, wherein no further information about a movement of the listener is required to provide him with sound signals based on a first HRTF in a first listening pose and sound signals based on a second HRTF in a second listening pose. Therefore, the listener can experience a realistic binaural effect without the need to operate a head-tracking system. Hardware expenses for the head-tracking system, processing capability and memory for real-time processing with low latency can be reduced, thus providing lower system cost, greater reliability, and a more realistic listening experience for the listener.

It is to be understood that the features mentioned above and features yet to be explained below can be used not only in the respective combinations indicated, but also in other combinations or in isolation, without departing from the scope of the present disclosure. In particular, features of the disclosed embodiments may be combined with each other in other embodiments.

It is to be understood that the features mentioned above and those yet to be explained below may be used not only in the respective combinations indicated, but also in other combinations or in isolation without departing from the scope of the disclosure.

BRIEF DESCRIPTION OF THE DRAWINGS

These and other objects of the disclosure will be appreciated and understood by those skilled in the art from the detailed description of the preferred embodiments and the following drawings in which like reference numerals refer to like elements.

DETAILED DESCRIPTION OF EXAMPLES

Figure 1:
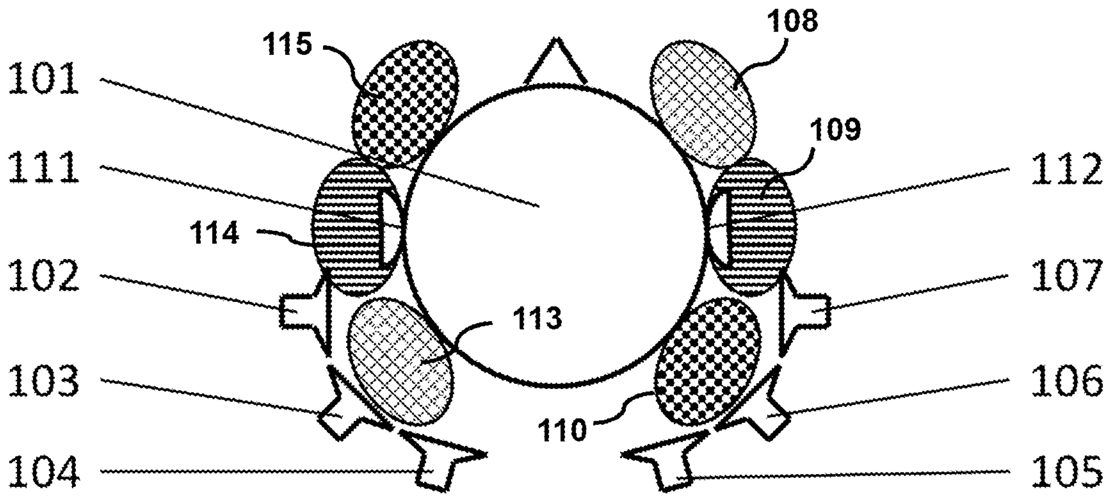
FIG. 1 schematically illustrates a plurality of spatial zones around a listener's head, according to various examples.

In the following, embodiments of the disclosure will be described in detail with reference to the accompanying drawings. It should be understood that the following description of embodiments is not to be taken in a limiting sense. The scope of the disclosure is not intended to be limited by the embodiments described hereinafter or by the drawings, which are taken to be illustrative examples of the general inventive concept. The features of the various embodiments may be combined with each other, unless specifically noted otherwise.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, elements, or other physical or functional units shown in the drawings or described herein may also be implemented by an indirect connection or coupling.

Hereinafter, techniques will be described that relate binaural rendering for different listening poses of a listener's head, without the need of head tracking information, I order to adapt to various HRTFs corresponding to the listening poses.

Some examples of the present disclosure generally provide for a plurality of processors, sensors, loudspeakers, or other electrical processing devices. All references to the circuits and other electrical devices and the functionality provided by each are not intended to be limited to encompassing only what is illustrated and described herein. It is recognized that any audio system, loudspeaker or other processing device disclosed herein may include any number of microcontrollers, a general-purpose processor unit (CPU), a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed. In various examples, processing devices may be embodied as remote or cloud computing devices. It is to be understood, that other sensors may be used for detecting vibrations in solid-state bodies, including sensor arrangements with optical, mechanical, electro-magnetic, or capacitive structures, which may be used, in order to detect a vibration in a solid-state body of a sound transducing element.

Conventional headrest audio systems suffer from a perceived sound stage behind the listener's head. This is caused by the location of the loudspeakers (physical sound sources), as these are placed behind the head. A listener detects the exact location of a loudspeaker by intuitively knowing his own head related transfer function (HRTF). If the location of the loudspeaker or the head rotation relatively to the source is changed, the HRTF from the loudspeaker to the left and right car changes. From this change in the perceived sound the listener knows the position of the source. To create the illusion of a loudspeaker location (virtual sound source), one approach is to use head-tracking systems. The sound applied to left and right car is processed with audio filters to create the same acoustical perception as known from the own HRTF, by modifying the output according to different HRTFs based on continuously acquired head-tracking information. The disadvantage of such techniques is that real-time computational effort in audio processing system and hardware for a head-tracking system are required, in order to create a realistic binaural effect for the listener. Providing and operating such a head-tracking system, as well as providing sufficient processing capability and memory generates additional cost and often is disturbed by latencies in the audio processing.

In general, HRTFs are applied in the context sound content rendering, wherein they refer to a specific filter that describes the transfer function between a loudspeaker typically on spherical surface and the car canal describing the sound field impinging towards a given head and torso under free field conditions, and is utilized for rendering spatial sound objects.

FIG. 1 schematically illustrates a plurality of spatial zones 108, 109, 110, 113, 114, 115 around a listener 101, according to various examples.

As can be seen in FIG. 1, the plurality of loudspeakers 102, 103, 104, 105, 106, 107 is arranged around a head of the listener 101. The plurality of loudspeakers is arranged as a left loudspeaker array including loudspeakers 102, 103, 104, located on the left side of the listener 101, and a right loudspeaker array including loudspeakers 105, 106, 107, located on the right side of the listener 101.

The arrangement of loudspeaker may correspond to an audio system for a headrest in which the listener's head is seated, and which is equipped with the two loudspeaker arrays 102-104 and 105-107, located behind or next to left and right ears 111, 112 of the listener 101.

The plurality of spatial zones 108, 109, 110, 113, 114, 115 includes a plurality of spatial zones 108,109,110 on the right side of the listener, which are for the right ear 112, and plurality of spatial zones 113, 114, 115 on the left side of the listener, which are for the left ear 111. The spatial zones 108, 109, 110, 113, 114, 115, which may in general also be referred to as sound zones, or spatial sound zones, are predefined regions in 3D space around the listener, in which simultaneously different sound signals are generated by the plurality of loudspeakers. When the listener adopts a central position, in which the listener looks straight forward, the left ear 111 is located within the spatial zone 114, and the right year 112 is located in the spatial zone 109.

In general, the spatial zones 108, 109, 110, 113, 114, 115 may be defined with respect to or based on a plurality of predefined listening poses of the listener.

Within each of the spatial zones 108, 109, 110, 113, 114, 115 a different respective sound signal is generated by the loudspeakers 102, 103, 104, 105, 106, 107 simultaneously. In various examples, at least two, or at least three, or at least four, or all of the loudspeakers 102, 103, 104, 105, 106, 107 contribute to the sound signal in one specific spatial zone, or each of two, or each of three, or each of the plurality of spatial zones 108, 109, 110, 113, 114, 115. In various examples, at least one, or each of at least two, or each of at least three, or each of all loudspeakers of the plurality of loudspeakers 102, 103, 104, 105, 106, 107, contributes to each sound signal in at least two, or at least three, or at least four, or all spatial zones 108, 109, 110, 113, 114, 115. In general, all loudspeakers 102, 103, 104, 105, 106, 107 can contribute to all sound signals in all spatial zones 108, 109, 110, 113, 114, 115.

Each of the different sound signals corresponds to, i.e. is generated using, a different Head Related Transfer Function (HRTF) of the listener. The sound signals in the respective spatial zones 108 and 113, as well as 109 and 114, as well as 110 and 115, may correspond to each other, in the sense that they use corresponding left and right car HRTFs for each respective listening pose, such that they enable the listener to perceive binaural sound conveying directional information. In this regard, the sound signals in spatial zones 113, 114, 115 may be generated using HRTFs of the left ear 111 of the listener 101, and the sound signals in spatial zones 108, 109, 110 may be generated using HRTFs of the right car 112 of the listener 101.

In the example of FIG. 1, in a central position of the listener 101, the listener 101 perceives binaural sound, as the listener perceives with his left ear 111 a sound signal generated from an (input) audio signal based on a HRTF of the left ear 111 within central spatial zone 114, and simultaneously with his right car 112 a corresponding sound signal generated from the input audio signal based on a HRTF of the right car 112 within central spatial zone 109. By the binaural sound, a positional information included in the input audio signal can be conveyed to the listener, as known in the art by processing and playing back an input audio signal to the user using the HRTFs for the left and right car 111, 112 simultaneously.

When the listener 101 turns his head, for example when he rotates his head to the left, his ears 111, 112 are moving together with the head, such as to leave the spatial zones and entering different spatial zones. With a rotation to the left, the listener's left ear 111 leaves spatial zone 114, and enters spatial zone 113, wherein the listener's right car 112 leaves spatial zone 109 and enters spatial zone 108. Similarly, rotating the head to the right brings the listener's cars 111, 112 into different spatial zones 110, 115.

Therefore, by rotating the head, the listener brings his cars 111 and 112 into different spatial zones 108, 110, 113, 115, wherein in the different spatial zones 108, 110, 113, 115 different HRTFs are used from the previous HRTFs in the central spatial zones, in order to create a different binaural sound for the listener 101. The movement of the head of the listener does no longer have to be tracked by a head tracking system, wherein the information from such a head-tracking system has to be processed in real-time for outputting a sound signal based on different HRTFs, but the sound signals based on a variety of different HRTFs are output simultaneously to the listener spatially limited to a number of different predefined spatial zones, wherein for a predefined listening pose of the listener, corresponding spatial zones are defined as the regions in 3D space, in which the listener's ears are located in the predefined listening pose, and the corresponding HRTFs are defined for the listening pose, respectively the spatial zones. For example, the HRTFs may be defined as the HRTFs that lead to a natural sound perception, such as HRTFs that would be generated merely based on a natural movement of the listener's head into the new listening pose, however it is to be understood that other HRTFs are possible.

Figure 2:
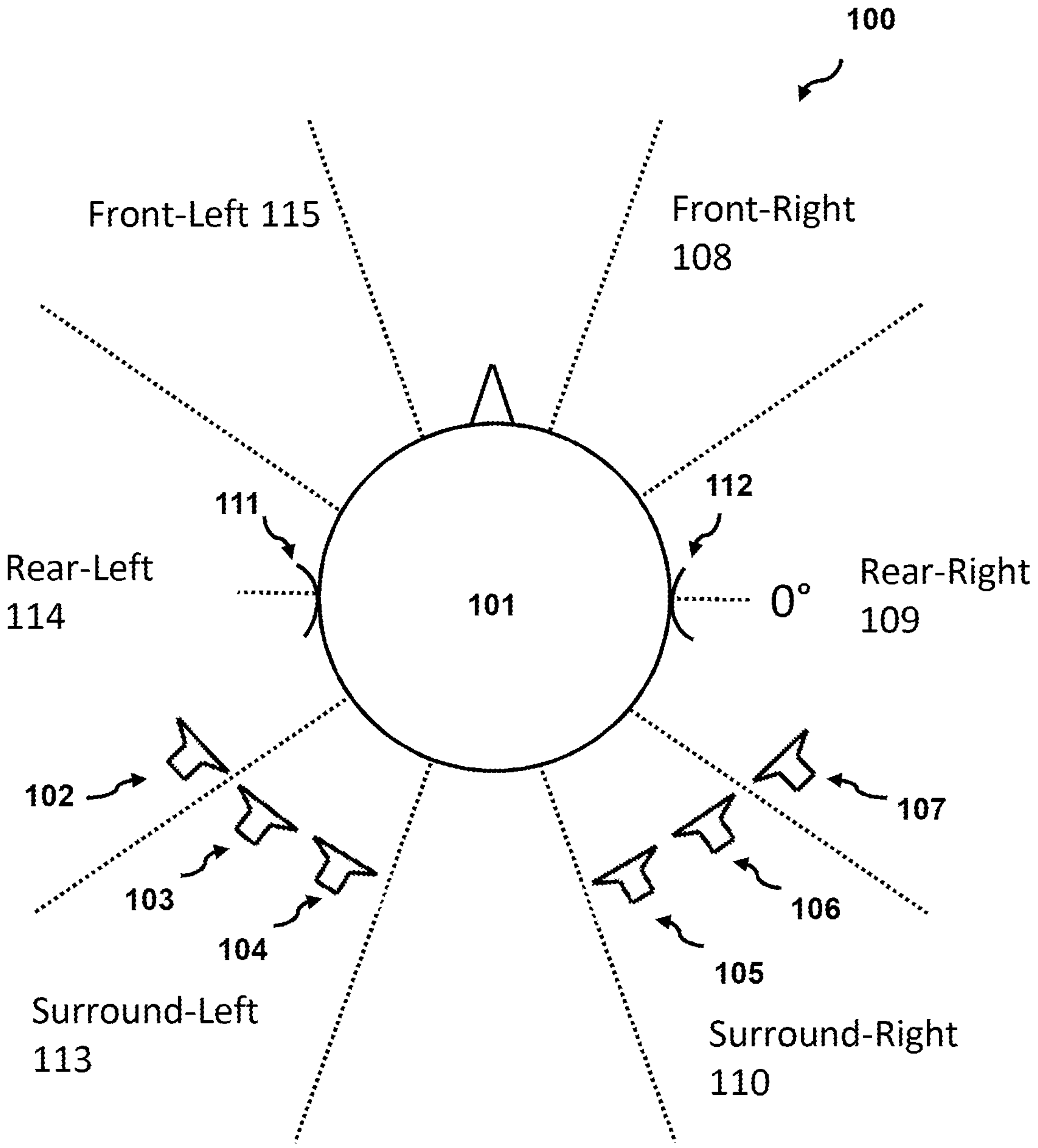
FIG. 2 schematically illustrates an angular division into spatial zones around a listener's head, according to various examples.

FIG. 2 schematically illustrates an angular division into spatial zones around a listener's head, according to various examples.

The schematic drawing of FIG. 2 corresponds to the audio system 100 of FIG. 1 and provides further details with regard to the angular distribution of different sound zones 108, 109, 110, 113, 114, 115.

As can be seen in FIG. 2, the spatial zones front-right 108, rear-right 109, surround-right 110, surround-left 113, rear-left 114, and front-left 115 are arranged around the listener's 101 head with regard to a central listening pose which designates 0° rotation with regard to a reference axis through the listener's ears.

As in FIG. 1, the sound signals in the spatial zones 108, 109, 110, 113, 114, 115 are generated by the plurality of loudspeakers 102, 103, 104, 105, 106, 107 simultaneously.

In various examples, the rear-left spatial zone 115 and the rear-right spatial zone 108 can include the central listening pose (0°) and may include a rotation of up to +/−15° or +/−20° of the listener's head.

In various examples, adjacent to the rear-left spatial zone 115 and the rear-right spatial zone 108, the front-left spatial zone 115 and the surround-right spatial zone 110 are arranged, which may correspond to a rotation of the listener's head from −15° or −20° until −40° or −60°. Further, the front-right spatial zone 108 and the surround-left spatial zone 113 may correspond to a rotation of the listener's head from +15° or +20° until to +40° or +60°. It is to be understood that these angular divisions are mere examples, and that any other division of the listener's surrounding into a plurality of sound zones is possible.

Figure 3:
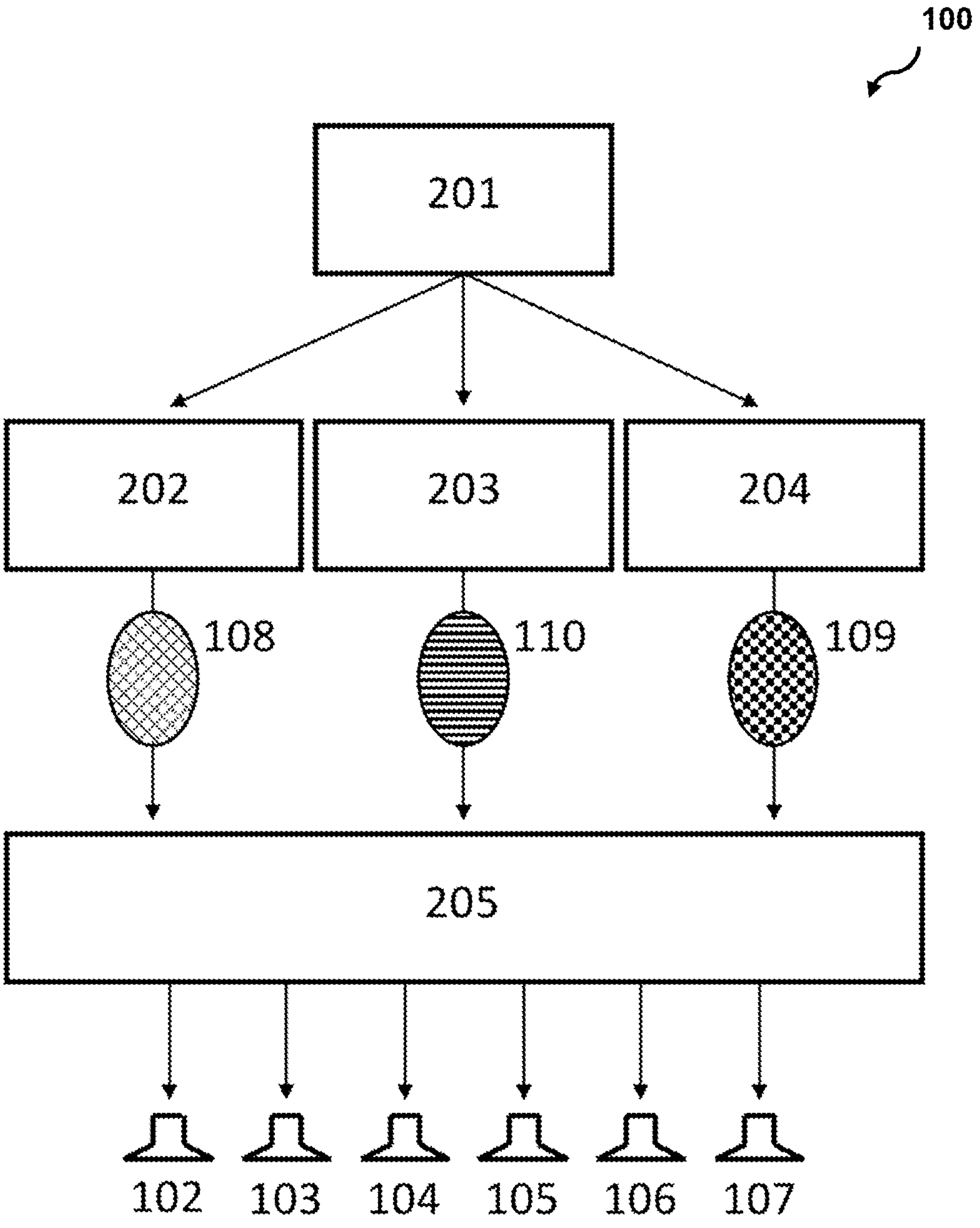
FIG. 3 schematically illustrates audio processing steps for an audio system, according to various examples.

FIG. 3 schematically illustrates audio processing steps for an audio system, according to various examples.

In a step, an input audio signal 201 is obtained. The audio signal 201 includes positional information (e.g. a stereo audio signal) and is send to several static MIMO filters 202, 203, 204 which operate based on predefined HRTFs determined for discrete head rotations.

In static MIMO filter 202, the input audio signal is processed using a first HRTF corresponding to a first listening pose of the listener, specifically calculated based on the position of listener's right ear 112 in the first listening pose, in order to generate a sound zone audio signal, which is to be output within and limited to a first spatial zone 108. In static MIMO filter 203, the input audio signal is processed using a second HRTF corresponding to a second listening pose of the listener, in order to generate a second sound zone audio signal, which is to be output within and limited to a second spatial zone 110. In static MIMO filter 204, the input audio signal is processed using a third HRTF corresponding to a third listening pose of the listener, in order to generate a third sound zone audio signal, which is to be output within and limited to a third spatial zone 109. Processing in static MIMO filters 202, 203, and 204 can be performed simultaneously. In MIMO filters 202, 203, and 204, for each sound zone audio signal, the source audio signal is convolved with an HRTF correlated with head rotation and the audio is played back simultaneously on all zones. As output of the static MIMO filters 202, 203, and 204 the sound zone audio signals for different sound zones 108, 109, 110 are provided.

In MIMO filter 205, the different sound zone audio signals are processed simultaneously, in order to generate loudspeaker input signals for each of the plurality of loudspeakers 102, 103, 104, 105, 106, 107.

The sound zone audio signals are provided to a MIMO filter 205 incorporating sound zone filters to create the loudspeaker signals for the predefined spatial zones around listeners head 101 based on the plurality of loudspeakers 102-107 being arranged at predefined positions. The MIMO filter generates the respective loudspeaker signal, such that each respective sound signal output based on a predefined HRTF is limited to its spatial zone.

It is to be understood, that FIG. 3 has been described with regard to spatial zones 108, 110, and 109, however is to be understood that the described techniques can be applied, in order to create any number of different spatial sound zones.

Figure 4:
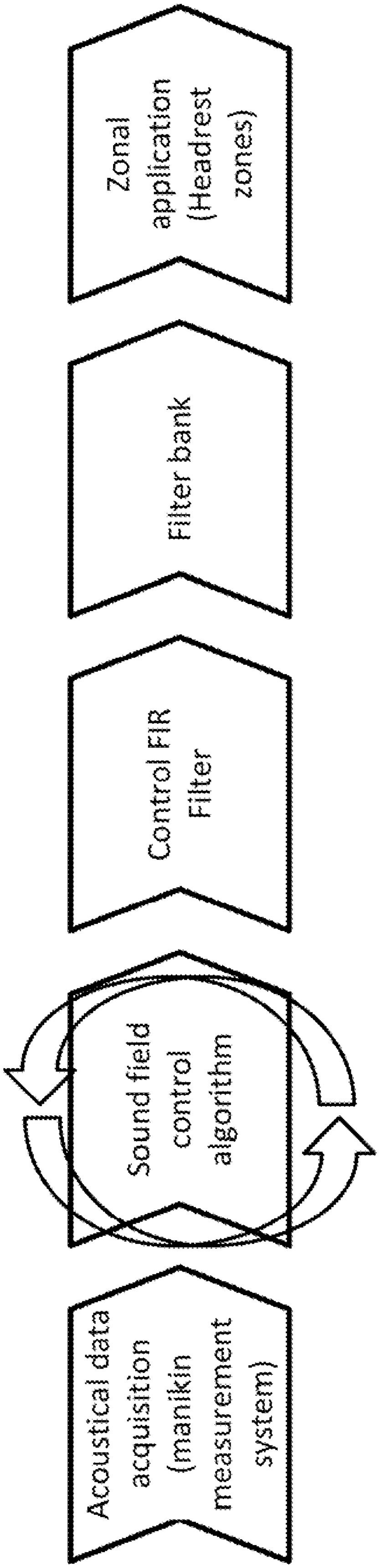
FIG. 4 schematically further illustrates the audio processing steps for the audio system of FIG. 3, according to various examples.

FIG. 4 schematically further illustrates the audio processing steps for the audio system of FIG. 3, according to various examples.

In a step, acoustical data acquisition is performed using a manikin measurement system, in order to determine a plurality of binaural room impulse responses (BRIR) for different predefined listening poses. In general, measurements of the sound field in situ, such as inside the car cabin at the seat position, utilizing a measurement manikin with ear-microphones is referred to as BRIR (Binaural Room Impulse Responses).

In a step a sound field control algorithm is applied iteratively, in order to generate sound field control filters for realizing the zonal listening environment.

In a step, to the resulting control filters as output from the algorithm in previous step is post-processed and organized according to the reproduction zonal scenario.

In a step, filters are stored in a filter bank such that each input corresponds to sound signals being reproduced inside each individual zone.

In a step, an audio signal is processed using the HRTFs and the zonal control filters, in order to generate respective sound signal in each of a plurality of headrest zones, wherein in each headrest zone, predominantly a sound signal of a specific HRTF can be perceived by a listener.

Figure 5:
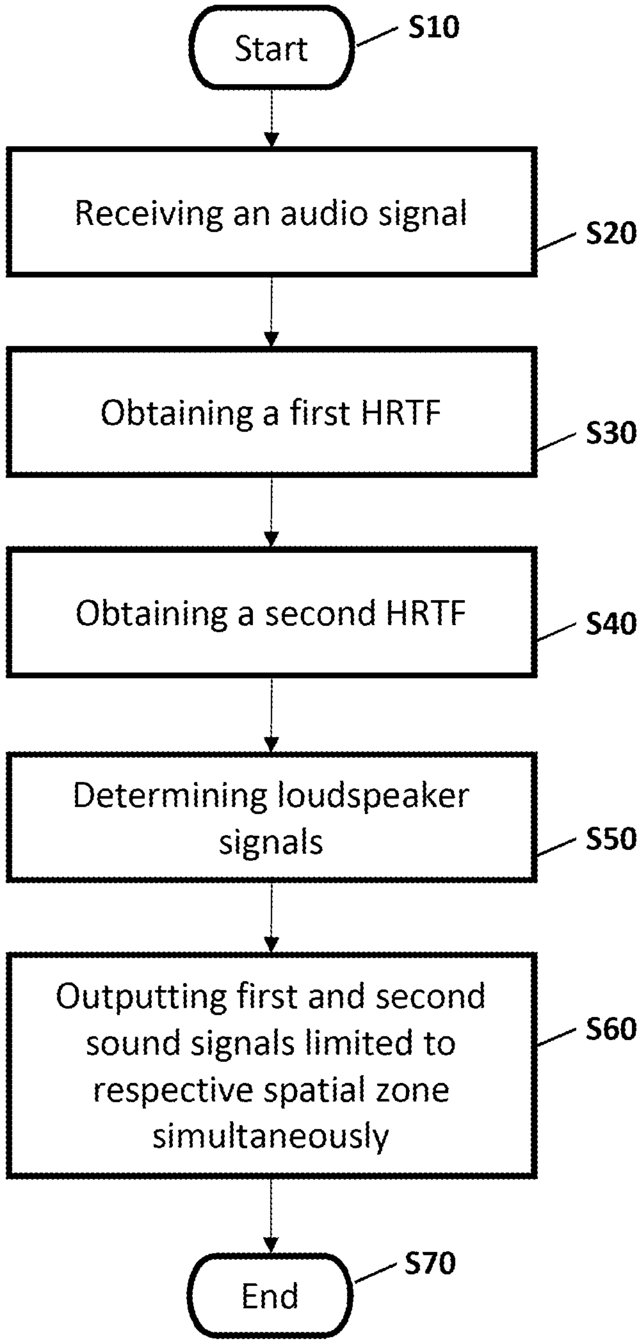
FIG. 5 schematically illustrates steps of a method for an audio system, according to various examples.

FIG. 5 schematically illustrates steps of a further method for an audio system, according to various examples.

The method starts in step S10. In step S20, an audio signal is received to be output to a listener. In step S30, a first Head Related Transfer Function (HRTF) corresponding to a first predefined listening pose of the listener is obtained. In step S40, a second HRTF corresponding to a second predefined listening pose of the listener different from the first pose is obtained. In step S50, for each of the plurality of loudspeakers, a respective loudspeaker signal is determined using the audio signal, the first HRTF and the second HRTF. In step S60, a first sound signal for the first listening pose corresponding to the first HRTF and limited to a first predefined spatial zone is output, and a second sound signal for the second listening pose corresponding to the second HRTF and limited to a second predefined spatial zone different from the first predefined spatial zone is output, by the plurality of loudspeakers using the loudspeaker signals, simultaneously. The method ends in step S70.

Figure 6:
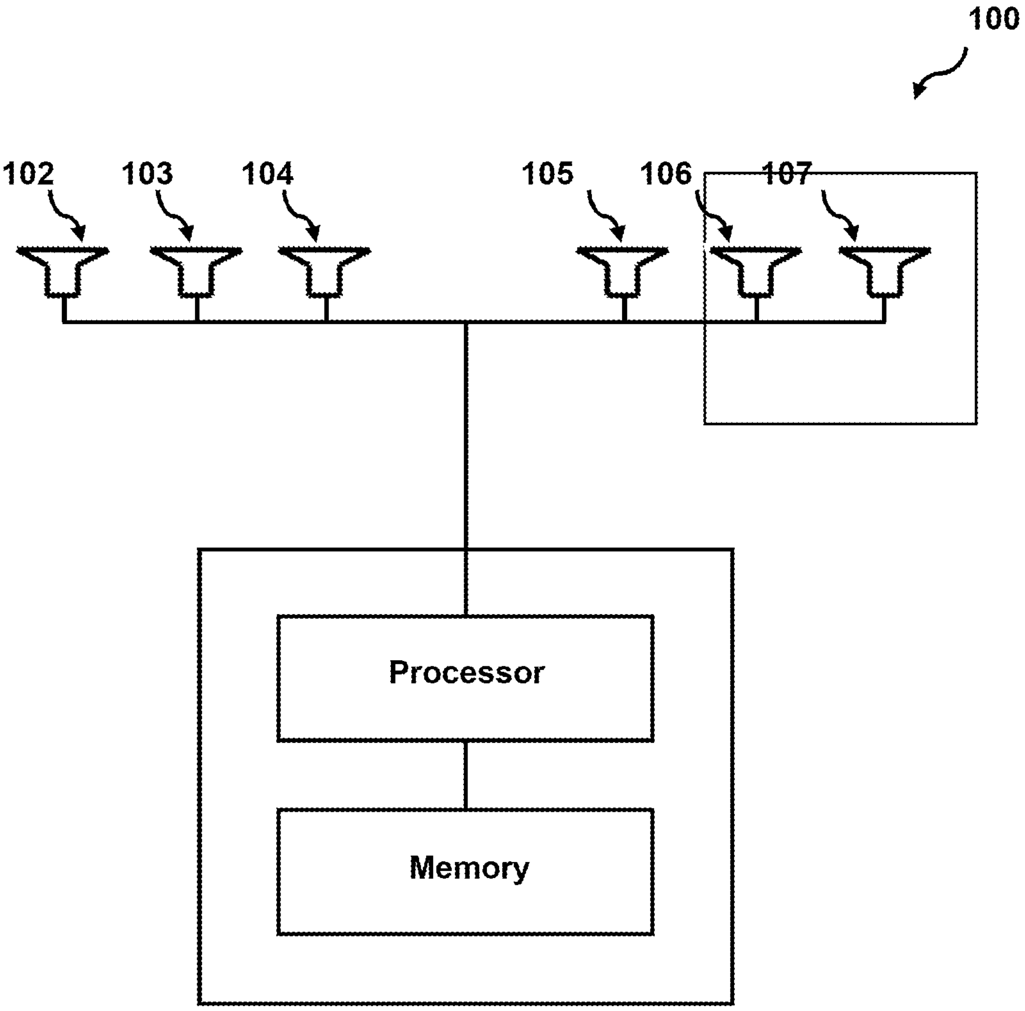
FIG. 6 schematically illustrates an audio system, according to various examples.

FIG. 6 schematically illustrates an audio system 100, according to various examples. The audio system 100 includes a plurality of loudspeakers 102-107, at least one processor and memory, the memory comprising instructions executable by the processor, wherein when executing the instructions in the processor, the computing device is configured to perform the steps of any method or combination of methods according to the present disclosure.

From the above said, the following general conclusions can be drawn:

A listening pose may refer to the orientation or position of the listener's head in relation to the loudspeakers. This listening pose results in a characteristic HRTF, which is a filter characterizing the acoustic properties associated with that pose in relation to a virtual sound source. Accordingly, this listening pose also may result in spatial zones, which are defined as 3-dimensional spatial regions around the listener's head when in a specific listening pose, where the cars are located and can receive sound.

Loudspeaker signals may be determined based on both the first and second HRTFs, wherein techniques for a spatially controlled sound field may be applied, such that the listener predominantly perceives the first sound signal corresponding to the first HRTF in the first spatial zone and predominantly perceives the second sound signal corresponding to the second HRTF in the second spatial zone.

Therefore it becomes clear that the first (respectively second) sound signal may correspond to, or refer to, or be (predominantly), a sound signal that is generated by processing the original audio with (only) the first (respectively second) HRTF, in other words a sound signal based on the characteristics of (only) the first (respectively second) HRTF, or analogous to a processed signal based on the audio signal with the first (respectively second) HRTF. In each specific spatial zone, the listener perceives only or predominantly a sound signal as being the audio signal processed using a single corresponding unique HRTF.

For this purpose, determining, for each of the plurality of loudspeakers a respective loudspeaker signal using the audio signal, the first HRTF and the second HRTF, may comprise applying or be based on or using spatial audio rendering techniques and/or spatial audio processing techniques, based on the loudspeakers, i.e. applying known techniques, for generating a spatially controlled sound field. Such known techniques may comprise one or more of e.g. spatial filtering, beamforming, sound field synthesis, such as Ambisonics and wave field synthesis, acoustic beamforming, however it is clear that the disclosure is not intended to be limited to a specific spatial audio processing technique. In an example, a MIMO filter (e.g. MIMO filter 205) may incorporate sound zone filter functionality. The further MIMO is a spatial filter that is used to create a spatially controlled sound field around the listener's head. The function of this filter is to ensure that the signal for each sound zone is predominantly heard within that zone, and not the others, thus creating a spatially controlled sound field around the listener's head with separate spatial sound zones.

The further MIMO filter may deploy sound zone filtering techniques, such as for example wave field synthesis or other similar techniques known in the art, to ensure that each respective sound signal based on a predefined HRTF is limited to its spatial zone, even though all speakers, or multiple speakers, can be used to create each sound zone. As known in the art, the loudspeakers in an array can be controlled independently to emit sound waves that constructively and destructively interfere to shape the overall spatially controlled sound field. The further MIMO filter calculates how each loudspeaker should contribute to each sound zone based on their relative positions and the desired sound field. The exact algorithms and optimization processes used for creating a spatially controlled sound field using a MIMO filter depend on the specific spatial audio and sound zone filtering techniques, and are known in the art.

Accordingly, when the cars of the listener are in a spatial zone, the listener perceives a sound signal as if it has been processed based on only the corresponding HRTF, i.e. the HRTF which corresponds to the spatial zone, i.e. the listening pose. The listener rotates his head, he hears another sound signal based on another HRTF as his ears enter another spatial sound zone of the spatially controlled sound field. In other words, within the spatially controlled sound field, when the listener turns their head, they hear the sound within the zone that their ears are physically in, which has been processed with the HRTF that corresponds to that head rotation. This gives the impression of a sound source that maintains consistent spatial characteristics irrespective of the listener's head orientation, without the need of head tracking.

The plurality of loudspeakers can be arranged at predefined positions around the listener, particularly around the listener's head.

Each loudspeaker of the plurality of loudspeakers, or at least two loudspeakers, or at least three loudspeakers, can contribute to the first sound signal, i.e. generate at least partly the first sound signal.

Each loudspeaker of the plurality of loudspeakers, or at least two loudspeakers, or at least three loudspeakers, can contribute to the second sound signal, i.e. generate at least partly the second sound signal.

A loudspeaker of the plurality of loudspeakers, or at least two loudspeakers, or at least three loudspeakers, can contribute to each of the first sound signal and the second sound signal.

Each of the loudspeakers in the plurality of loudspeakers can contribute to each of the sound signals in the respective spatial zones.

The audio signal can be a stereo audio signal.

The first listening pose and the second listening pose of the listener's head can be different rotational positions of the listener's head.

The listener can receive predominantly the first sound signal when the listener's head is in the first listening pose, and wherein the listener can receive predominantly the second sound signal when the listener's head is in the second listening pose.

A listener's ear can be located within, or near, or adjacent, the first predefined spatial zone when the listener's head is in the first listening pose, and the listener's ear can be located within, or near, or adjacent, the second predefined spatial zone, when the listener's head is in the second listening pose.

At least one loudspeaker of the plurality of loudspeakers can be included in a headrest of a seat.

The disclosed techniques can be applied to an audio system in a vehicle.

The disclosed techniques can be applied to a plurality of seats in an indoor room or outdoor location, in general to a plurality of individual hearing positions of a listener, when there are predefined listening poses.

The first sound signal, which can be output, i.e. played out or broadcasted, within the first predefined spatial zone can comprise a sound signal generated by processing the audio signal using the first HRTF. In other words, the first sound signal can be based on the first HRTF, and not on the second HRTF.

The second sound signal, which can be output within the second predefined spatial zone, can correspond to a sound signal generated by processing the audio signal using the second HRTF. The second sound signal can be based on the second HRTF, and not the first HRTF.

Determining the respective loudspeaker signals can comprise processing the audio signal using the first HRTF to output a first sound zone audio signal, wherein the first sound signal output within the first spatial zone corresponds to the first sound zone audio signal, and processing the audio signal using the second HRTF to output a second sound zone audio signal, wherein the second sound signal output within the second spatial zone corresponds to the second sound zone audio signal, and processing the first and the second sound zone audio signals by a multiple-input and multiple-output (MIMO) filter, in order to generate the respective loudspeaker signals, wherein multiple loudspeakers of the plurality of loudspeaker contribute to the first or second sound signal.

Determining the respective loudspeaker signals can comprise processing the audio signal using the first HRTF and the second HRTF by a MIMO filter.

Although the disclosed techniques have been described with respect to certain preferred embodiments, equivalents and modifications will occur to others skilled in the art upon the reading and understanding of the specification. The present disclosure includes all such equivalents and modifications and is limited only by the scope of the appended claims.

For illustration, above, various scenarios have been disclosed in connection with a vehicle. Similar techniques may be readily applied to other kinds and types of solid systems, such as for example buildings, electronic consumer devices, or any kind of outdoor or indoor structure, which may comprise a surface of a solid-state material exposed to and receiving an external sound field.

What is claimed is:

1. A computer-implemented method carried out by an audio system comprising at least a processor and a plurality of loudspeakers, comprising:

receiving an audio signal to be output to a listener;

obtaining a first Head Related Transfer Function (HRTF) corresponding to a first predefined listening pose of the listener;

obtaining a second HRTF corresponding to a second predefined listening pose of the listener different from the first predefined listening pose;

determining, for each of the plurality of loudspeakers a respective loudspeaker signal using the audio signal, the first HRTF, and the second HRTF; and simultaneously outputting, via the plurality of loudspeakers using the loudspeaker signals, a first sound signal for the first predefined listening pose corresponding to the audio signal as processed with the first HRTF and limited to a first predefined spatial zone, and a second sound signal for the second predefined listening pose corresponding to the audio signal as processed with the second HRTF and limited to a second predefined spatial zone different from the first predefined spatial zone.

2. The computer-implemented method of claim 1, wherein the first and the second predefined spatial zones are each finite spatial regions in 3-dimensional space around a head of the listener.

3. The computer-implemented method of claim 1, wherein the plurality of loudspeakers are arranged at predefined positions around the listener, and wherein each loudspeaker of the plurality of loudspeakers contributes to the first sound signal or each loudspeaker of the plurality of loudspeakers contributes to the second sound signal.

4. The computer-implemented method of claim 1, wherein each loudspeaker of the plurality of loudspeakers contributes to each of the first sound signal and the second sound signal.

5. The computer-implemented method of claim 1, wherein the audio signal is a stereo audio signal.

6. The computer-implemented method of claim 1, wherein the audio signal comprises positional information, wherein the positional information defines a position, at which a sound event included in the audio signal is perceived by the listener, wherein, in the first and the second predefined listening poses, the sound event is perceived at different positions relative to the listener.

7. The computer-implemented method of claim 1, wherein the listener receives predominantly the first sound signal when a head of the listener is in the first predefined listening pose, and wherein the listener receives predominantly the second sound signal when the head of the listener is in the second predefined listening pose.

8. The computer-implemented method according to claim 7, wherein an ear of the listener is located within the first predefined spatial zone when the head of the listener is in the first predefined listening pose, and the ear of the listener is located within the second predefined spatial zone, when the head of the listener is in the second predefined listening pose.

9. The computer-implemented method of claim 7, wherein the first predefined listening pose and the second predefined listening pose are different rotational positions of the head of the listener.

10. The computer-implemented method of claim 1, wherein at least two loudspeakers of the plurality of loudspeakers are included in a headrest of a seat.

11. The computer-implemented method of claim 1, wherein:

the first sound signal output within the first predefined spatial zone corresponds to a sound signal generated by processing the audio signal using the first HRTF; and the second sound signal output within the second predefined spatial zone corresponds to a sound signal generated by processing the audio signal using the second HRTF.

12. The computer-implemented method of claim 11, wherein determining the respective loudspeaker signals comprises:

processing the audio signal using the first HRTF to generate a first sound zone audio signal, wherein the first sound signal output within the first predefined spatial zone corresponds to the first sound zone audio signal; and processing the audio signal using the second HRTF to generate a second sound zone audio signal, wherein the second sound signal output within the second predefined spatial zone corresponds to the second sound zone audio signal; and processing the first and the second sound zone audio signals by a multiple-input and multiple-output (MIMO) filter to generate the respective loudspeaker signals, wherein multiple loudspeakers of the plurality of loudspeakers contribute to the first or second sound signals.

13. The computer-implemented method of claim 1, wherein determining the respective loudspeaker signals comprises:

processing the audio signal using the first HRTF and the second HRTF by a MIMO filter.

14. One or more non-transitory computer-readable media storing instructions that, when executed by one or more processors, cause the one or more processors to perform the steps of:

receiving an audio signal to be output to a listener;

obtaining a first Head Related Transfer Function (HRTF) corresponding to a first predefined listening pose of the listener;

obtaining a second HRTF corresponding to a second predefined listening pose of the listener different from the first predefined listening pose;

determining, for each of a plurality of loudspeakers a respective loudspeaker signal using the audio signal, the first HRTF, and the second HRTF; and simultaneously outputting, via the plurality of loudspeakers using the loudspeaker signals, a first sound signal for the first predefined listening pose corresponding to the audio signal as processed with the first HRTF and limited to a first predefined spatial zone, and a second sound signal for the second predefined listening pose corresponding to the audio signal as processed with the second HRTF and limited to a second predefined spatial zone different from the first predefined spatial zone.

15. The one or more non-transitory computer-readable media of claim 14, wherein the audio signal comprises positional information, wherein the positional information defines a position, at which a sound event included in the audio signal is perceived by the listener, wherein, in the first and the second predefined listening poses, the sound event is perceived at different positions relative to the listener.

16. The one or more non-transitory computer-readable media of claim 14, wherein the listener receives predominantly the first sound signal when a head of the listener is in the first predefined listening pose, and wherein the listener receives predominantly the second sound signal when the head of the listener is in the second predefined listening pose.

17. The one or more non-transitory computer-readable media of claim 14, wherein:

the first sound signal output within the first predefined spatial zone corresponds to a sound signal generated by processing the audio signal using the first HRTF; and the second sound signal output within the second predefined spatial zone corresponds to a sound signal generated by processing the audio signal using the second HRTF.

18. The one or more non-transitory computer-readable media of claim 14, wherein determining the respective loudspeaker signals comprises:

processing the audio signal using the first HRTF to generate a first sound zone audio signal, wherein the first sound signal output within the first predefined spatial zone corresponds to the first sound zone audio signal; and processing the audio signal using the second HRTF to generate a second sound zone audio signal, wherein the second sound signal output within the second predefined spatial zone corresponds to the second sound zone audio signal; and processing the first and the second sound zone audio signals by a multiple-input and multiple-output (MIMO) filter to generate the respective loudspeaker signals, wherein multiple loudspeakers of the plurality of loudspeakers contribute to the first or second sound signals.

19. The one or more non-transitory computer-readable media of claim 14, wherein determining the respective loudspeaker signals comprises:

processing the audio signal using the first HRTF and the second HRTF by a MIMO filter.

20. An audio system, comprising:

memory storing instructions;

one or more processors; and plurality of loudspeakers arranged around a head of a listener;

wherein the one or more processors, when executing the instructions, are configured to:

receive an audio signal to be output to the listener;

obtain a first Head Related Transfer Function (HRTF) corresponding to a first predefined listening pose of the listener;

obtain a second HRTF corresponding to a second predefined listening pose of the listener different from the first predefined listening pose; and determine, for each of the plurality of loudspeakers a respective loudspeaker signal using the audio signal, the first HRTF and the second HRTF; and wherein the loudspeakers are configured to:

simultaneously output, using the loudspeaker signals, a first sound signal for the first predefined listening pose corresponding to the audio signal as processed with the first HRTF and limited to a first predefined spatial zone, and a second sound signal for the second predefined listening pose corresponding to the audio signal as processed with the second HRTF and limited to a second predefined spatial zone different from the first predefined spatial zone.

* * * * *